(12) United States Patent
Gong

(10) Patent No.: US 8,505,657 B2
(45) Date of Patent: Aug. 13, 2013

(54) VEHICLE SUSPENSION AND DRIVE SYSTEM

(76) Inventor: Xiaolong Gong, West Bloomfield, MI (US)

( * ) Notice: Subject to any disclaimer, the term of this patent is extended or adjusted under 35 U.S.C. 154(b) by 647 days.

(21) Appl. No.: 12/648,920

(22) Filed: Dec. 29, 2009

(65) Prior Publication Data

US 2011/0155484 A1 Jun. 30, 2011

(51) Int. Cl.
*B60K 1/00* (2006.01)
(52) U.S. Cl.
USPC .............................. 180/65.1; 180/55; 180/907
(58) Field of Classification Search
USPC ................ 180/65.1, 65.51, 252, 253, 55, 62, 180/907, 908, 6.5; 280/124.17, 124.171, 280/37; 267/41, 246, 188
See application file for complete search history.

(56) References Cited

U.S. PATENT DOCUMENTS

| 4,196,918 | A | * | 4/1980 | Strader | 280/478.1 |
|---|---|---|---|---|---|
| 4,313,618 | A | * | 2/1982 | Robinson | 280/124.134 |
| 4,405,027 | A | * | 9/1983 | Enokimoto et al. | 180/56 |
| 4,415,051 | A | * | 11/1983 | Taylor | 180/65.1 |
| 4,436,320 | A | * | 3/1984 | Brudermann et al. | 280/250.1 |
| 4,947,955 | A | * | 8/1990 | Hopely, Jr. | 180/216 |
| 5,240,086 | A | * | 8/1993 | Hopely, Jr. | 180/208 |
| RE34,433 | E | * | 11/1993 | Heiligenthal et al. | 16/35 R |
| 5,979,920 | A | * | 11/1999 | Krakowiak et al. | 280/124.175 |
| 5,988,660 | A | * | 11/1999 | Tattermusch | 280/124.171 |
| 6,341,657 | B1 | * | 1/2002 | Hopely et al. | 180/6.5 |
| 6,412,804 | B1 | * | 7/2002 | Dignat | 280/283 |
| 6,672,606 | B1 | * | 1/2004 | Dwyer et al. | 280/124.165 |
| 6,834,734 | B2 | * | 12/2004 | Wu | 180/65.51 |
| 7,007,765 | B2 | * | 3/2006 | Waters et al. | 180/19.3 |
| 7,029,017 | B2 | * | 4/2006 | Zandbergen et al. | 280/124.106 |
| 7,455,306 | B2 | * | 11/2008 | Ramsey et al. | 280/124.128 |
| 2005/0016780 | A1 | * | 1/2005 | Richey et al. | 180/65.1 |
| 2011/0260424 | A1 | * | 10/2011 | Pollymeyer et al. | 280/124.171 |

* cited by examiner

*Primary Examiner* — Katy M Ebner
(74) *Attorney, Agent, or Firm* — The Weintraub Group, P.L.C.

(57) ABSTRACT

The present invention pertains to a lightweight, portable, electric vehicle having a novel steering mechanism, a low profile suspension and drive mechanism, and which also provides a superior ride quality, handling, and drivability. The vehicle generally comprises a frame and at least one suspension and motor assembly. Each suspension and motor assembly includes at least one leaf spring mounted to the frame, a motor connected to the leaf spring, the motor having a drive shaft, and a wheel rotatably connected to the drive shaft. The vehicle also includes means for powering the motor and means for controlling to enable a user to drive the vehicle.

8 Claims, 6 Drawing Sheets

VEHICLE SUSPENSION AND DRIVE SYSTEM

BACKGROUND OF THE INVENTION

1. Field of the Invention

The present invention pertains to an electric vehicle. More particularly, the present invention pertains to an electric vehicle having a low profile suspension and drive mechanism, and which is lightweight, compact, and portable. Even more particularly, the present invention pertains to a stowable, foldable, lightweight, portable, electric vehicle having a novel steering mechanism, a low profile suspension and drive mechanism, and which also provides superior ride quality, handling, and drivability.

2. Description of the Prior Art

Foldable vehicles having a drive mechanism are well-known in the art, as disclosed by U.S. Pat. No. 7,451,848 to Flowers et al. The vehicle disclosed by Flowers is a foldable personal mobility vehicle comprising a pair of wheels rotatable about a front and a rear axle. The rear axle includes a drive unit incorporated into the rear axle wheels. The suspension and drive mechanisms disclosed by Flowers are designed for particular use with a foldable vehicle; however, it does not have a low profile to the ground.

In addition, U.S. Pat. No. 6,374,934 to Beck et al., and U.S. Patent Application Publication Nos. 2002/0170764 to Oshima et al. and 2003/0094315 to White each disclose a low-profile vehicle having a drive mechanism. However, neither of the vehicles disclosed by Beck, Oshima, or White have a suspension system which provides drivability or a ride quality comparable to a modern automobile.

Thus, there remains a need for a vehicle which has a low profile suspension system and provides ride quality comparable to a modern automobile.

The present invention, as is detailed hereinbelow, seeks to resolve these issues by providing a lightweight vehicle which is easy to carry, simple to manufacture, and which has a low profile suspension and drive mechanism which provides drivability and ride quality comparable to modern automobiles.

SUMMARY OF THE INVENTION

In a first embodiment hereof, the present invention provides a vehicle which generally comprises:
(a) a frame;
(b) at least one independent suspension and motor assembly, each suspension and motor assembly including at least one leaf spring mounted to the frame, a motor connected to the at least one leaf spring, the motor having a drive shaft, and a wheel rotatably connected to the drive shaft;
(c) means for powering the motor; and
(d) means for controlling the vehicle, the means for controlling enabling a user to drive the vehicle.

In a second aspect hereof, the present invention also is directed to a suspension and motor assembly for use with a vehicle and which generally comprises:
(a) at least one leaf spring mounted to the vehicle;
(b) a motor connected to the at least one leaf spring, the motor having a drive shaft; and
(c) a wheel rotatably connected to the drive shaft.

The vehicle hereof is foldable and stowable and can accommodate a single user or may be expandable to accommodate multiple users.

For a more complete understanding of the present invention, reference is made to the following detailed description and accompanying drawings. In the drawing, like reference characters refer to like parts throughout the views in which:

DETAILED DESCRIPTION OF THE PREFERRED EMBODIMENT

At the outset it is to be noted that a vehicle as described in the ensuing disclosure is to be understood by one having ordinary skill in the art as being any type of wheeled frame or chassis for transporting people or objects, including but not limited to, automobiles, golf carts, shopping carts, wheeled luggage, wheelchairs, flatbeds, and so forth. The present invention has equal efficiency in conjunction with wheeled vehicles of any type and of any suitable size.

Figure 1:
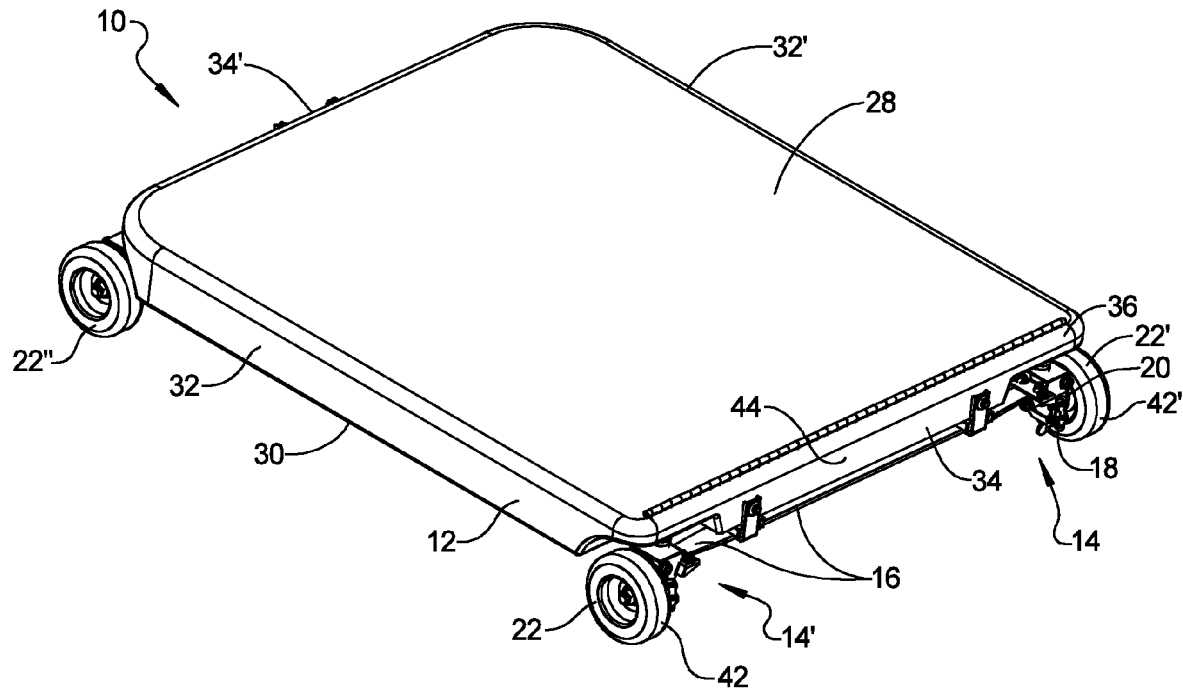
FIG. 1 is a perspective view of a first embodiment of the present invention hereof.
Figure 2:
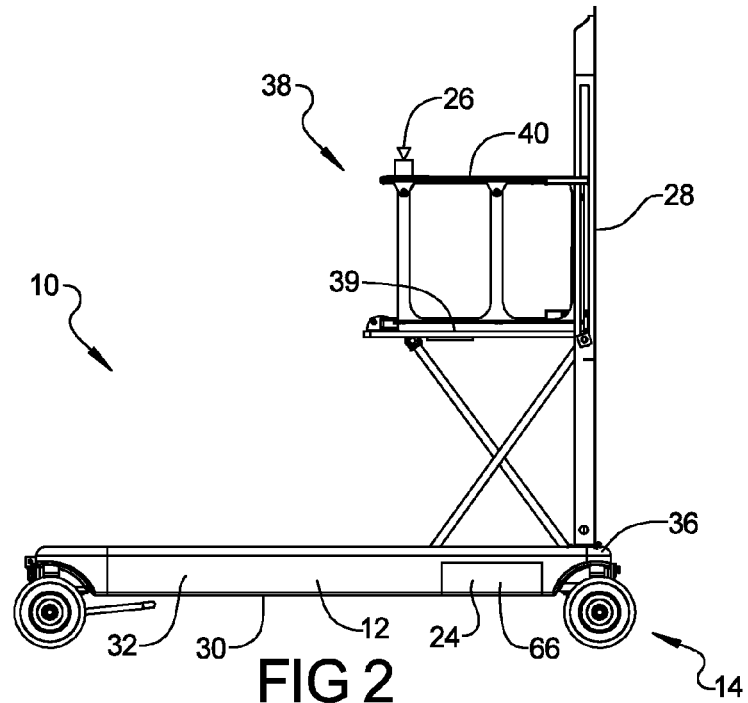
FIG. 2 is a perspective view of the first embodiment showing the top surface expanded and the seat and arm rests folded out.

In accordance with the present invention and as shown generally in FIGS. 1 and 2, there is provided a vehicle 10 which generally comprises: (a) a frame 12; (b) at least one suspension and motor assembly 14, each suspension and motor assembly 14 including at least one leaf spring 16 mounted to the frame 12, a motor 18 connected to the at least one leaf spring 16, the motor 18 having a drive shaft 20, and a wheel 22 rotatably connected to the drive shaft 20; (c) means for powering 24 the motor 18; and (d) means for controlling 26 to enable a user to drive the vehicle 10.

With more particularity, the frame 12 can be any type of frame which is well-known in the art and which is suitable for use in supporting and providing structure to the vehicle 10. According to the embodiment shown in FIGS. 1 and 2, the frame 12 comprises a generally rectangular box-like structure having substantially planar top and bottom surfaces, 28 and 30, respectively, side surfaces 32,32', medial section 44, and end surfaces 34,34'. The top surface 28 can be pivotally secured to a top edge 36 of the end surface 34 via a piano hinge or the like (not shown).

A platform 39 pivotally folds out from the top surface 28, and a pair of spaced apart armrests 40 pivotally folds out from either the platform 39 or the top surface 28. The platform 39 and the pair of armrests 40 provide a seat 38 for a passenger. The seat 38 and the armrests 40 can each pivot with respect to each other using any suitable means which are well-known in the art, such as a piano hinge to enable the seat 38 to collapse and stow within the top surface 28.

Figure 7:
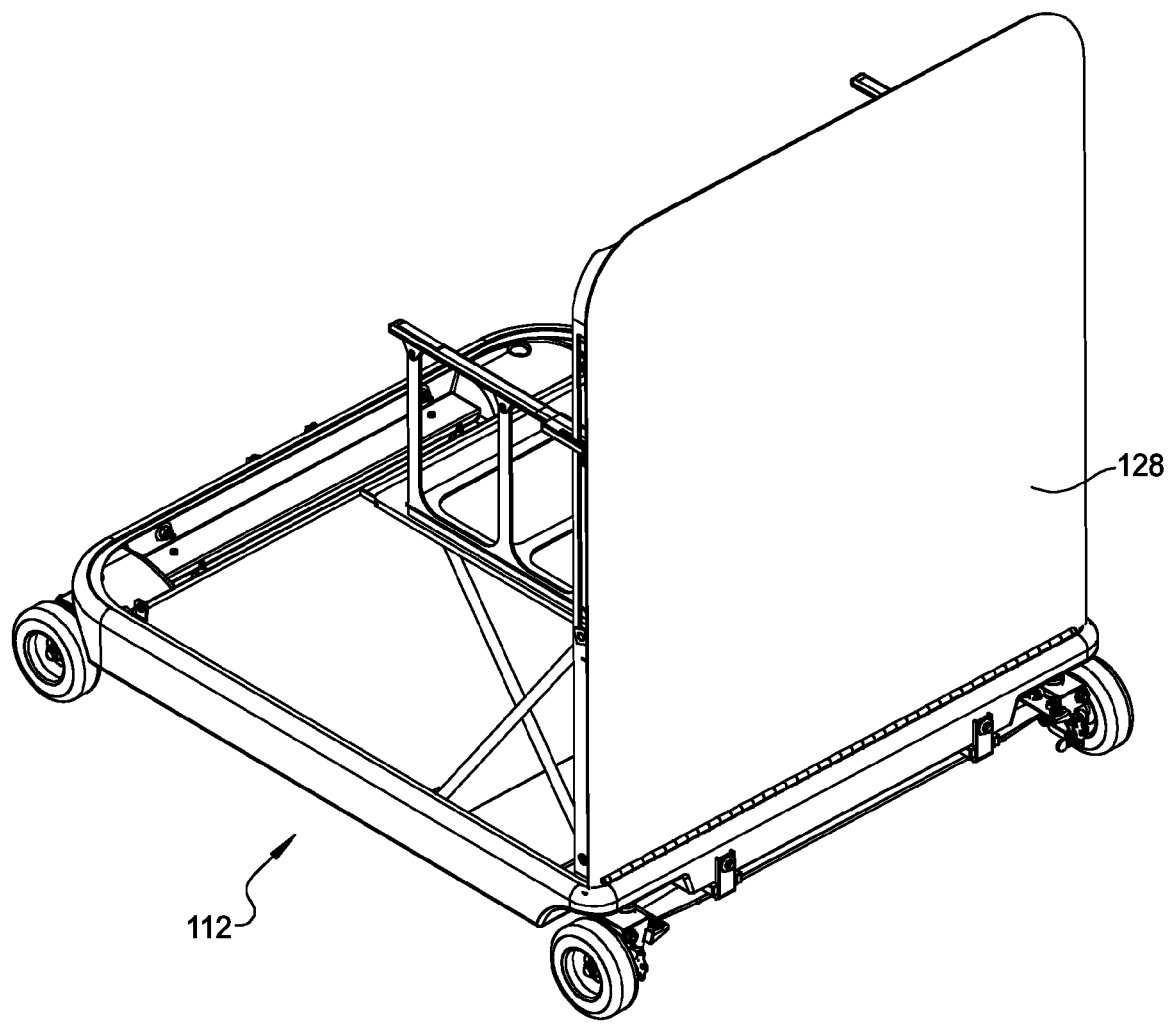
FIG. 7 is a perspective view of the vehicle hereof showing a seating arrangement having two seats side-by-side.

As shown in FIG. 7, the vehicle 10 can include any suitable seating arrangement, including a frame 112 and a top surface 128 sufficiently wide to accommodate two seats side-by-side. In addition, the vehicle 10 can include a frame 12 sufficiently long to include a pair of rotatable top surfaces each having its own seat (not shown), one being in front of the other to accommodate two seats, or any other suitable arrangement herewith.

In order to increase the energy efficiency associated with the vehicle 10, it is desirable that the vehicle 10 be lightweight. Therefore, the frame 12 is preferably formed from materials such as magnesium, cast aluminum, carbon fiber, or the like.

The vehicle 10 includes at least three wheels 22,22',22", at least two of which are drive wheels 42,42'. Each drive wheel 42,42' includes a suspension and motor assembly 14. Although the vehicle 10 includes at least two suspension and motor assemblies 14,14', for purposes of illustration and clarity, the ensuing description will be made with reference solely to the suspension and motor assembly 14.

Figure 3:
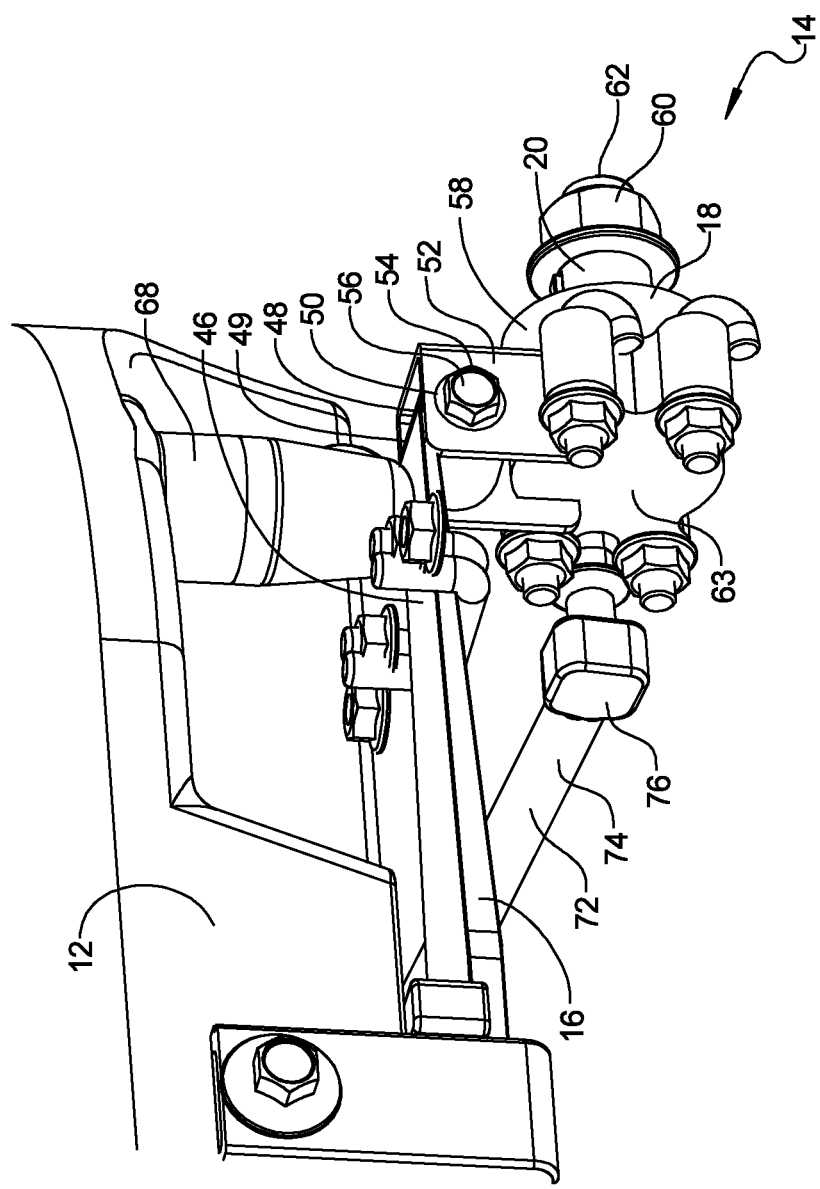
FIG. 3 is an enlarged view of the suspension and motor assembly used herein without the wheel being mounted thereon.
Figure 4:
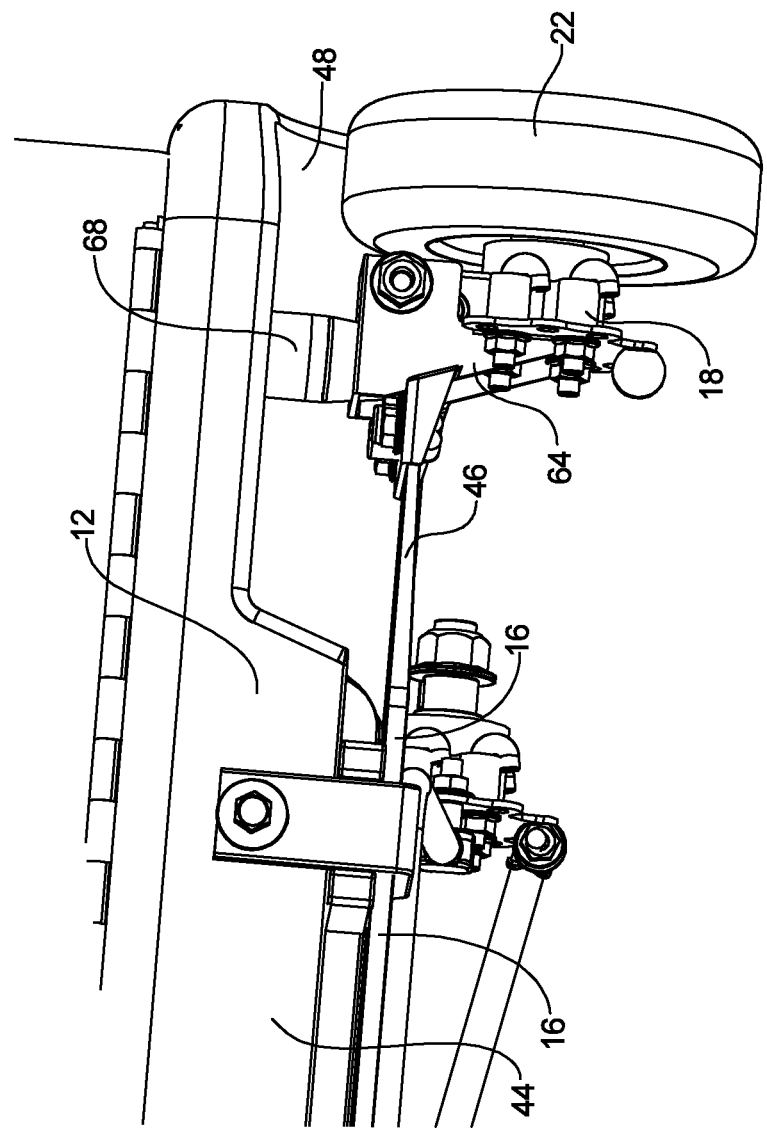
FIG. 4 is an enlarged view of the suspension and motor assembly including a knuckle bracket and a jounce bumper.

As shown more closely in FIGS. 3 and 4, the suspension and motor assembly 14 includes at least one leaf spring 16 mounted to the frame 12. The leaf spring 16 is mounted to the vehicle 10 by any suitable means, such as with brackets and fasteners, welding, or the like. Preferably, the leaf spring 16 is oriented substantially parallel to the axis of rotation of the wheel 22. The leaf spring 16 is mounted to the frame 12 near a medial section 44 of the frame 12, thus allowing the end portion 46 of the leaf spring 16 to flex up and down. The leaf spring 16 is suitably dimensioned for use with the particular vehicle 10, and is formed from any type of material which is well-known in the art, including but not limited to, spring steel, carbon steel, alloy steel, carbon fiber, polymers, and the like.

As shown in FIG. 1, although it is not necessary, a single leaf spring 16 may be provided for use with a pair of opposed suspension and motor assemblies 14,14' which are axially aligned.

A motor 18 having a housing 58 and a drive shaft 20 is also included in the suspension and motor assembly 14. The housing 58 is connected to the end portion 46 of the leaf spring 16 by any suitable means, such as welding, fasteners (e.g., nuts and bolts), or the like. The motor 18 can include a motor bracket 52 for connecting the motor 18 with the leaf spring 16. The motor 18 is any type of electrical motor suitable for use herewith. It is to be understood by one of ordinary skill in the art that the motor 18 is appropriately sized to match the size and anticipated weight of the vehicle 10 (including cargo), taking into consideration the desired speed and performance characteristics required for the particular vehicle 10. In addition, the motor 18 can be geared to meet the performance characteristics required for the particular vehicle 10.

Means for enabling rotation 48 can be provided to connect the end portion 46 of the leaf spring 16 and the motor 18 to allow relative rotational movement therebetween. When used, the means for rotation 48 is connected to both the end portion 46 of the leaf spring 16 and the housing 58 and/or the motor bracket 52 of the motor 18 to allow relative rotational movement between the leaf spring 16 and the housing 58. The means for rotation 48 can include a bushing, a hinge, or any other well-known low-frictional structure as understood by one having ordinary skill in the art.

Preferably the means for rotation 48 comprises a bushing assembly 49. As shown particularly in FIG. 3, the bushing assembly 49 is such that the end portion 46 of the leaf spring 16 is turned to form a cylindrical passageway 50. The motor bracket 52 can have a pair of opposed holes 54,54' which are sized and dimensioned to match the diameter and length of the cylindrical passageway 50. A bushing (not shown) is inserted into and through the motor bracket holes 54,54' and the cylindrical passageway 50, and a fastener 56, such as a bolt and nut, secure the cylindrical passageway 50, motor bracket 52, and bushing in place so that the bushing operably enables free rotational movement between the leaf spring 16 and the motor 18.

A wheel 22 is connected to the drive shaft 20. The wheel 22 is secured to the drive shaft 20 by any suitable means which are well known in the art, including a threaded lug nut 60 secured to a threaded free end 62 of the drive shaft 20, a cap (not shown) frictionally fit over the end of the drive shaft 20, and so forth.

The wheel 22 can be any type of wheel which is suitable for use with the particular embodiment, including but not limited to, a solid rubber wheel, a hub and wheel including a rubber tire, and so forth. It is to be understood by one of ordinary skill in the art that the type of wheel chosen may be dependent upon factors such as the size of the vehicle 10, desired performance characteristics, and the anticipated road conditions.

Although not shown, means for interlocking to eliminate slip between the drive shaft 20 and the wheel 22 may be provided. For instance, the means for interlocking can include the drive shaft 20 having a key, and the wheel 22 having a complementary keyhole. The means for interlocking can also include a disc-shaped flange which is fixed to the drive shaft 20, such as by welding or any other means which are wellknown in the art. In this case, the flange can include a plurality of studs which correspond to a plurality of holes located in the wheel 22. The studs are secured into and through the holes in the wheel 22 by means such as press-fit caps over the ends of the studs, or the studs being threaded and threadably secured to lug nuts (such as utilized by modern automobiles), or the like.

The suspension and motor assembly 14 can also include means for braking 63. For example, the drive shaft 20 can extend through the entire motor housing 58 and be disposed on the end of the motor 18 opposite the wheel 22. The drive shaft 20 can include the requisite structural elements (e.g., a rotor) and be operably connected with a braking mechanism, such as a disc brake assembly, a drum brake assembly, or any other brake assembly which is well-known to one having ordinary skill in the art. It is noted that when the vehicle 10 is dimensioned for small applications, it is possible that the means for braking 63 may not need to be included since the resistance torque from the motor 18 may provide sufficient braking for the vehicle 10.

It is also noted that when the motor 18 is not energized, the kinetic energy of the vehicle 10 rotates the drive shaft 20 within the motor housing 58, and the motor 18 can act as a generator to regenerate electricity which can be stored and later used to power the motor 18. For instance, during cruising or braking, up to 100% of the kinetic energy of the vehicle can rotate the drive shaft 20.

Figure 5:
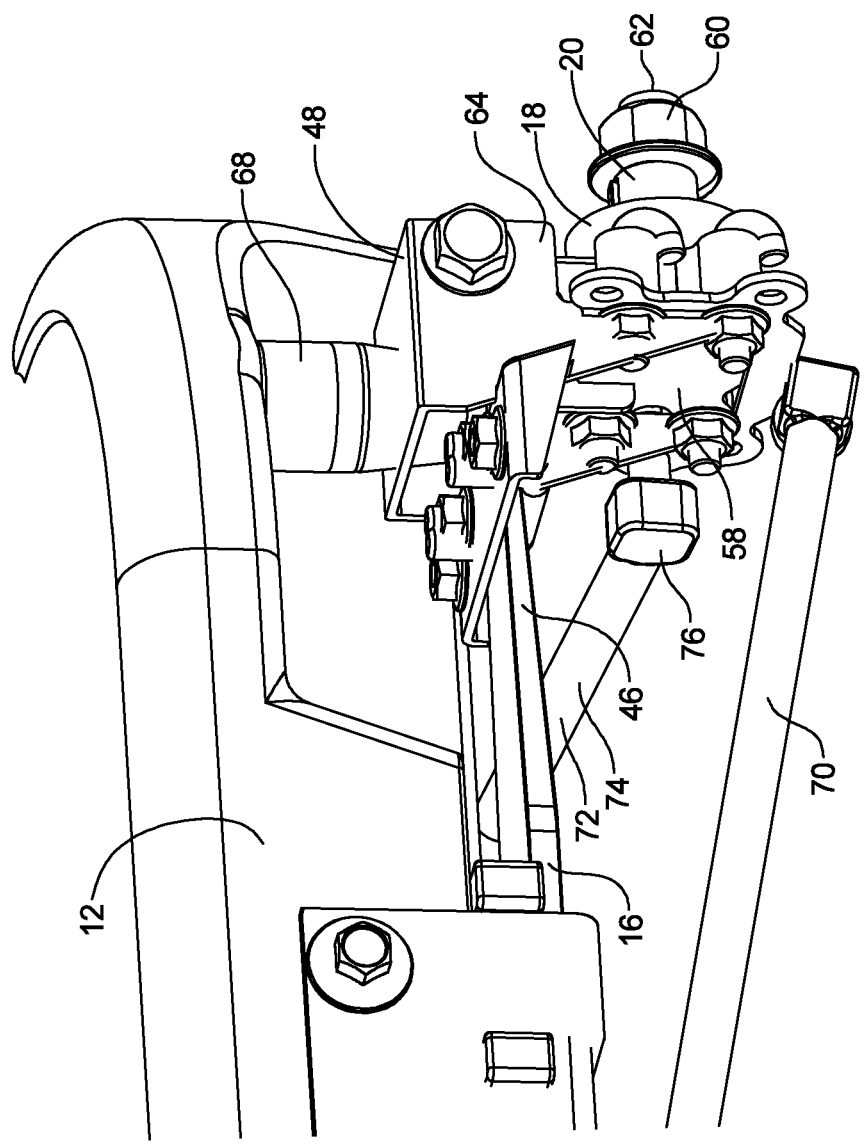
FIG. 5 is an enlarged view of the suspension and motor assembly without the wheel and showing an optional knuckle bracket.

Optionally, and as shown in FIGS. 4 and 5, the suspension and motor assembly 14 can also include a knuckle bracket 64 to provide additional strength and stability to the suspension and motor assembly 14. As discussed below, the knuckle bracket 64 can be secured to the leaf spring 16, the means for rotation 48, the motor housing 58, and/or any additional suspension elements by any suitable means which are wellknown in the art, including fasteners such as brackets and bolts, welding, or the like.

The vehicle 10 also includes means for powering 24 for powering the motor 18. The means for powering 24 can include an electrical system capable of storing and delivering electricity to the motor 18, for instance, at least one battery 66 and electrical wiring system (not shown). When provided, the battery 66 can be any suitable type of battery for use herewith, including but not limited to, lead-acid, NiCd, nickel metal hydride, lithium ion, Li-ion polymer, zinc-air, and molten salt batteries. When the battery 66 is used, it is preferable that the battery 66 hold a sufficient charge to allow the vehicle 10 to travel at least 150 km or more on a single charge. It is also to be understood that by providing a sufficiently large battery, or a plurality of batteries, the vehicle 10 can travel up to 600 km or more before it is necessary to recharge the battery. Since the vehicle 10 is lightweight, the travel distance and accompanying battery(ies) required will be dictated primarily by the anticipated cargo weight, more so than the curb weight (such as with typical vehicles).

The means for powering 24 can include any other suitable powering structure as understood by one having ordinary skill in the art, such as a track having an electrified rail (not shown) as used by a subway train, a trolley car, or an electric bus.

The vehicle 10 also includes means for controlling 26 to enable the user to drive the vehicle 10. The means for controlling 26 can include any suitable type of control mechanism to control the speed and direction of the vehicle 10 which are well-known and understood in the art. Preferably, the means for controlling 26 allows the user to control the speed and direction of rotation at each drive wheel independently 42,42' in order to steer the vehicle 10. Since conventional steering components like a rack and pinion are not necessary herewith, the overall weight and number of moving parts of the vehicle 10 is reduced, and therefore the vehicle 10 is able to be lower to the ground. It is anticipated that this preferable steering mechanism can provide a minimum turning radius of 0.

Alternatively, the vehicle 10 can include at least two pivotable wheels (not shown) which pivot about the caster axis to control steering of the vehicle 10. As understood by one having ordinary skill in the art, the caster axis is aligned along the caster angle and defines the axis of rotation for steerable wheels in a vehicle. The pivotable wheels can be located in the front of the vehicle 10, in the rear of the vehicle 10, or both.

The means for controlling 26 can also include an electronic control system (not shown) for varying the speed and direction of rotation at each drive wheel to navigate the vehicle 10 as instructed by an operator. The means for controlling 26 can also include any suitable structure which is well-known in the art for the operator to drive the vehicle 10, including but not limited to, a pedal and steering wheel, a joystick, a wireless remote control, or the like. It is even contemplated in the case of an individual suffering from paralysis that as technology advances, the means for controlling 26 could include the transmission of electrical impulses from the operator's brain to direct the vehicle 10.

As shown in FIGS. 3-5, the vehicle 10 can optionally include additional suspension elements to further improve performance and handling. For instance, a jounce bumper 68 can be provided for each leaf spring 16. As understood by one having ordinary skill in the art, a jounce bumper 68, or bump stop, is an elastic cushion used to soften the suspension gradually as it reaches the upper end of its jounce travel. The jounce bumper 68 is made from any suitable type of material which is well-known in the art, e.g., microcellular polyurethane. The jounce bumper 68 is secured to the frame 12 of the vehicle 10 proximal to the end portion 46 of the leaf spring 16 using fasteners, adhesives, or any other suitable means which are well-known in the art. The jounce bumper 68 is positioned above the end portion 46 of the leaf spring 16 to dampen the upper stroke of the leaf spring 16 and to ensure that none of the components in the suspension and motor assembly 14 contact the frame 12 of the vehicle 10 as the leaf spring 16 approaches the uppermost point of its jounce travel.

When the vehicle 10 has a low mass construction, the suspension travel can be reduced. This allows the jounce bumper 68 to be active with the leaf spring 16 throughout the entire suspension jounce travel.

The suspension and motor assembly 14 can include a lower link 70 (aka, an LCA) to help control the wheel camber and the roll center height of the vehicle 10. It is to be appreciated by one having ordinary skill in the art that the inclusion of a lower link 70, as well as the lower link's 70 mounting points, material type, and size are dictated by the suspension tuning necessary for the vehicle 10 dependent upon factors like vehicle size, weight, and desired performance, ride, and handling.

Figure 6:
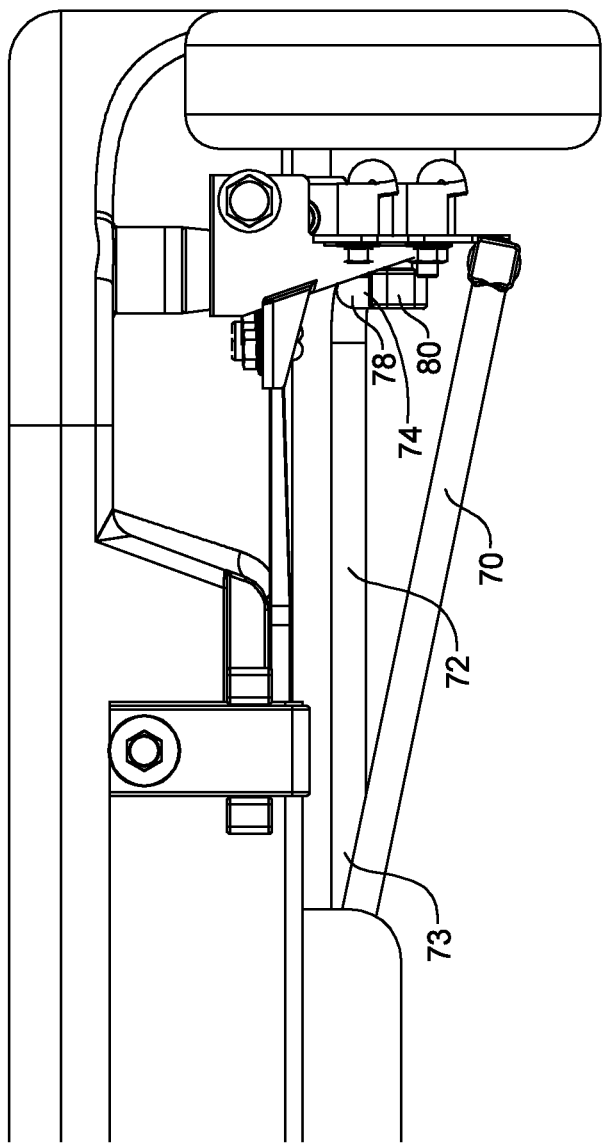
FIG. 6 is an enlarged view of the suspension and motor assembly showing an optional lower link and stabilizer bar.

As shown in FIGS. 3 and 6, the suspension and motor assembly 14 can also include a stabilizer bar 72 to stabilize vehicle roll. The stabilizer bar 72 includes a bar end 73 and a swing arm 74. The bar end 73 is connected to the frame 12 by any suitable means which are well-known in the art, including a ball joint, a universal joint, an elastic rubber-isolated clamp, or the like. The swing arm 74 has a first end 76 and a second end 78, and is preferably oriented perpendicular to the axis of rotation of the wheel 22. The first end 76 is connected to the motor housing 58 (and/or the knuckle bracket 64 when provided) by any suitable means which are well-known in the art, including a ball joint, a universal joint, or the like. The second end 78 of the swing arm 74 is connected to the frame 12 using an elastic, or rubber-isolated clamp 80, or any other means which are well-known in the art for mounting a swing arm to a vehicle. It is to be appreciated by one having ordinary skill in the art that the swing arm 74 is provided to help control caster, anti-pitch, and anti-squat. The inclusion of the stabilizer bar 72, as well as the mounting points of the stabilizer bar 72, the diameter of the stabilizer bar 72, and the bushing rate of the clamp 80 are dictated by the suspension tuning necessary for the vehicle 10 dependent upon factors like vehicle size, weight, and desired performance, ride, and handling.

It is to be understood that the spring rate of the suspension can be adjusted by manipulating any number of factors, including but not limited to, the leaf spring 16 material, the pivotable length of the leaf spring 16, the inclusion of a lower link 70, the inclusion of a stabilizer bar 72, and the size and elasticity of the jounce bumper 68 (when provided).

In addition to the top surface 28 and seating arrangements described above, the present invention can also include a vehicle body (not shown) mounted atop the frame 12 and the top surface 28 to form the box-like structure. The box-like structure contains compartments for stowing internal components (e.g., a battery) which can be accessed via the top surface 28 and/or via an access panel or door (not shown) on the bottom surface 30. In such an embodiment, the vehicle body can include seats, doors, safety equipment (e.g., seat belts, crash extensions) and any other features found in a typical automobile.

Furthermore, it is to be understood by one of ordinary skill in the art that the vehicle 10 need not include seats. Rather, the vehicle 10, such as configured in FIG. 1, is suitable for transporting objects, for instance, packages, luggage, groceries, or the like.

According to the invention described above, a vehicle is provided which can be lightweight and portable, yet provides superior performance, ride, and handling. The vehicle can be sufficiently small and lightweight that it can be used as a personal transportation device and stowed away and carried onto a vehicle such as a train, a conventional automobile, or an airplane. Thus, it is seen that the present invention describes a vehicle which has applications for a wide variety of purposes. For instance, at an airport a user can fold out the seat, load his/her luggage onto the vehicle, and drive the vehicle to the terminal. The vehicle can then be either stored in an airport locker or carried onto the airplane as carry-on luggage.

In addition, in an urban setting in which individuals rely upon taxis or public transportation to perform routine activities such as grocery shopping, a user can use the vehicle to drive to the grocery store, load the groceries onto the vehicle while shopping, and then drive the vehicle back home with the groceries stowed atop the vehicle. It is seen that the present invention provides a vehicle which has numerous uses and applications.

As used herein, the phrase "connected to" describes the relationship in which a first element is either directly connected to a second element, or the first element is indirectly connected to a second element via one or more interconnecting elements.

As is apparent from the preceding, the present invention provides an electric vehicle having a low profile suspension and drive mechanism which provides ride quality comparable to modern automobiles.

What is claimed is:

1. An electric vehicle comprising:
   (a) a frame having a box-like structure and a top surface, the top surface being pivotably connected to the box-like structure, and the top surface including a seat which is pivotably connected thereto;
   (b) at least one suspension and motor assembly, the at least one suspension and motor assembly including at least one leaf spring mounted to the frame, a motor connected to the at least one leaf spring, the motor having a drive shaft, and a wheel rotatably connected to the drive shaft;
   (c) means for powering the motor; and
   (d) means for controlling the vehicle, the means for controlling enabling a user to drive the vehicle, wherein the means for controlling independently controls the speed and direction of rotation of the wheel associated with the suspension and motor assembly.

2. The vehicle of claim 1 having at least two suspension and motor assemblies, and at least four wheels in total.

3. The vehicle of claim 1 wherein the leaf spring is oriented substantially parallel to the axis of rotation of the wheel, and the motor is connected to an end of the leaf spring.

4. The vehicle of claim 1 wherein the means for powering comprises at least one battery.

5. The vehicle of claim 1 wherein the leaf spring is oriented substantially parallel to the axis of rotation of the wheel.

6. The vehicle of claim 2 wherein the leaf spring is oriented substantially parallel to the axis of rotation of the wheel.

7. The vehicle of claim 1 having a jounce bumper connected to the frame and positioned proximal to an end of the leaf spring such that the end of the leaf spring contacts the jounce bumper when the end of the leaf spring is at an upper end of jounce travel.

8. The vehicle of claim 1 having a stabilizer bar including a bar end connected to the frame, and a swing arm connected to a clamp and the motor.

* * * * *